(12) United States Patent
Nelson et al.

(10) Patent No.: US 7,110,861 B2
(45) Date of Patent: *Sep. 19, 2006

(54) DILUTING SYSTEM AND METHOD (75) Inventors: Mark Nelson, Orinda, CA (US); Mike Townsend, Clayton, CA (US); Brad Davidson, Walnut Creek, CA (US)

(73) Assignee: Force Flow, Concord, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/002,464

(22) Filed: Dec. 3, 2004

(65) Prior Publication Data

US 2005/0102067 A1 May 12, 2005

Related U.S. Application Data (63) Continuation of application No. 10/230,076, filed on Aug. 27, 2002, now Pat. No. 6,845,298.

(60) Provisional application No. 60/316,580, filed on Aug. 31, 2001.

(51) Int. Cl.
G05B 21/00 (2006.01)
G06F 17/00 (2006.01)

(52) U.S. Cl. ............... 700/265; 700/239; 700/285; 700/305; 366/141

(58) Field of Classification Search ............... 700/67, 700/68, 80, 239, 265, 281, 282, 285, 305; 137/403; 366/132, 140, 141; 702/50, 55
See application file for complete search history.

(56) References Cited

U.S. PATENT DOCUMENTS

| | | | |
|---|---|---|---|
| 3,647,363 A | 3/1972 | Chart et al. | |
| 3,779,602 A | 12/1973 | Beard et al. | |
| 3,877,682 A | 4/1975 | Moss | |
| 4,181,533 A | 1/1980 | Wilson | |
| 4,353,482 A | 10/1982 | Tomlinson et al. | |
| 4,648,043 A | 3/1987 | O'Leary | |
| 4,725,149 A | 2/1988 | Kawakami et al. | |
| 4,830,125 A | 5/1989 | Aoki et al. | |
| 4,830,508 A | 5/1989 | Higuchi et al. | |
| 4,836,685 A | 6/1989 | Verreault | |
| 5,116,945 A | 5/1992 | Osawa et al. | |
| 5,288,145 A | 2/1994 | Mackey et al. | |
| 5,402,834 A | 4/1995 | Levin et al. | |
| 5,558,435 A | 9/1996 | Marjo | |
| 5,567,283 A * | 10/1996 | Lynn et al. | 204/228.6 |
| 5,611,937 A | 3/1997 | Jarocki | |
| 5,746,238 A | 5/1998 | Brady et al. | |
| 6,120,175 A | 9/2000 | Tewell | |
| 6,513,964 B1 * | 2/2003 | Himmelright et al. | 366/141 |
| 6,706,533 B1 * | 3/2004 | Nomura et al. | 436/150 |
| 6,762,832 B1 * | 7/2004 | Fisher et al. | 356/300 |

FOREIGN PATENT DOCUMENTS

DE 200 11 779 9/2001

(Continued)

OTHER PUBLICATIONS

Brochure, untitled, *Wallace & Tiernan Products*, Chemfeed Limited, Priority Works (Tonbridge, Kent, England), undated, 5 pages.

Primary Examiner—Jayprakash N. Gandhi
(74) Attorney, Agent, or Firm—Buchanan Ingersoll & Rooney PC (57) ABSTRACT A system and a method for automatically, accurately diluting chemical solutions on an industrial scale based upon real time weight measurements of chemical and diluent weight is disclosed.

21 Claims, 8 Drawing Sheets

FOREIGN PATENT DOCUMENTS

| EP | 1 025 795 | 8/2000 |
| JP | 60 241923 | 11/1985 |
| JP | 5 180799 | 7/1993 |
| WO | WO 99/56189 | 11/1999 |

* cited by examiner

DILUTING SYSTEM AND METHOD

CROSS-REFERENCE TO RELATED APPLICATIONS

This application is a continuation of U.S. patent application Ser. No. 10/230,076, filed Aug. 27, 2002, now issued as U.S. Pat. No. 6,845,298, which claims priority under 35 U.S.C. §119 to U.S. Provisional Application No. 60/316, 580, entitled Diluting System and Method and filed Aug. 31, 2001, the entire content of which is hereby incorporated by reference.

FIELD OF THE INVENTION

This invention relates to a system for preparing diluted chemical solutions for use in industrial processes. More particularly, it relates to an apparatus and associated controller for preparing and dispensing such solutions and the methods of diluting which they permit.

BACKGROUND OF THE INVENTION

Traditionally, diluting chemicals from their neat chemical strengths to something less has been accomplished via a venturi method or by volume via a level probe in a dilution tank. Both of these methods have drawbacks which cannot be solved due to inherent limitations in their technologies.

In the case of a typical venturi dilution method, a flow of diluent is passed through a venturi. This flow creates a suction into which predilution material is drawn from a feed tank. The two flows mix in the venturi to form the desired diluted stream. This method is very inaccurate. It is adversely affected by variables in the diluent velocity, by any changes in flow cross-section, such as those which occur if there is even the slightest fouling or contamination of the venturi, and by any changes in back pressure in the undiluted chemical feed tank.

The level probe method bases the dilution on a series of volumes measured in a dilution tank. Conventionally, in the case of dilution, this involves measuring a predetermined volume of predilution material into the dilution tank and thereafter adding a similarly predetermined volume of diluent to the tank and mixing. (Of course, the order of addition can be reversed, if desired.) This process has the disadvantages of not permitting user flexibility in changing the starting or ending solution strengths. In addition, to get an accurate solution strength in weight percent using level probes, the operator making the dilution must manually account for differences in the specific gravity of the predilution material and the diluent.

One setting where dilutions are commonly carried out is in the field of water treatment. In water treatment facilities it is becoming less desirable to store and add gaseous chlorine to water as a sterilant and purification aid. Government regulators are increasingly concerned about environmental and health hazards which can arise when gaseous chlorine is inadvertently released. Sodium hypochlorite is an attractive alternative. This compound is sold commercially as aqueous solutions. To minimize transportation and storage costs, these aqueous solutions are as concentrated as possible. Commonly these concentrated feeds contain about 10–16% by weight sodium hypochlorite. When this material is used, it is often at a substantially lower concentration which is achieved by dilution of the commercial feed solution. This dilution is carried out on an as-needed basis around the clock in most water treatment facilities.

In the case of sodium hypochlorite, this dilution is not straightforward. The chemical make up of the feed solution varies with time because the hypochlorite exists in solution in equilibrium with hypochlorous acid which in turn is capable of disproportionating to generate free chlorine which can escape as a gas. Thus, the concentration of a supply of hypochlorite will be decreasing with time and the specific gravity of the supply solution will be decreasing as well as the chlorine is given off. Also, the need for correct treatment of water is a matter of public health so there is a strong desire for a dilution system and method which can operate reliably, document accurate operation and minimize the chances for operator error.

BRIEF DESCRIPTION OF THE INVENTION

We have now discovered that solutions of chemicals such as sodium hypochlorite can be diluted most accurately and reliably with a high degree of automation in common industrial settings when the dilution is based upon the actual weights of chemical and diluent employed. The use of weight values facilitates corrections and adjustments based upon changes in neat chemical and/or diluent composition. They also facilitate corrections based upon detection of overshoots in the feed of either material.

Thus, in one aspect this invention provides a substantially automated dilution control system for diluting a liquid solution or suspension of a chemical such as sodium hypochlorite. This system includes a dilution tank of known capacity for preparing the chemical in a desired diluted concentration. This tank is mounted upon an electronic scale which is capable of generating an infinite series of weight signals related to the weight of the tank when empty and when partially or completely filled. The tank is in liquid communication with a source of concentrated or "neat" chemical and a source of diluent. The concentrated chemical is of a variable, but known or determinable, concentration. The flows of chemical and diluent are controlled by a diluent flow controller and a chemical flow controller, respectively, both of which are, in turn controlled by a microprocessor-based system controller. The weight signals from the scale are transmitted to the system controller. The system controller is capable of receiving the following pieces of data:

(1) a value related to the dilution tank capacity;
(2) a value related to the variable, concentrated chemical concentration;
(3) a value related to the desired diluted concentration; and
(4) a series of weight signals from the scale.

The controller calculates the weights of concentrated chemical and diluent required to provide a target weight of diluted chemical of desired diluted concentration which does not exceed the known capacity of the dilution tank. The system controller controls the chemical feed flow controller and the diluent feed flow controller based upon the series of weight signals received from the scale to produce a produced weight of diluted chemical of the desired diluted concentration. The produced weight corresponds closely to the target weight of diluted chemical. The value related to the variable chemical concentration may be a concentrated value calculated on the basis of other decomposition rate constant, temperature and time, it may be a value based on direct chemical analysis of the concentrated chemical or it may be a value based upon measurement of specific gravity of the concentrated chemical or the like.

In another aspect, this invention provides a method for diluting a liquid solution or suspension of a chemical to a desired dilution. This method involves obtaining a dilution system as described just above and operating the system in one of two manners. The first manner involves the steps of:

(a) inputting into the system controller information concerning the target amount of diluted chemical and/or the capacity of the system's dilution tank, the concentration of the concentrated chemical feed and the desired dilution;

(b) calculating in the system controller the amount of concentrated chemical feed having a known, but variable, concentrated chemical concentration required to produce the target weight of diluted chemical not exceeding the capacity of the dilution tank;

(c) charging concentrated chemical feed to the dilution tank;

(d) transmitting to the system controller a weight signal related to the weight of concentrated chemical feed measured by the system's scale as actually charged to the tank;

(e) controlling the flow of concentrated chemical into the dilution tank with the system controller and the concentrated chemical flow controller so that the actual weight of concentrated chemical charged does not exceed the weight required to produce the target weight of diluted chemical and the capacity of the dilution tank;

(f) calculating in the system controller the amount of diluent required to produce the target weight of diluted chemical not exceeding the capacity of the dilution tank;

(g) charging diluent to the dilution tank;

(h) transmitting to the system controller a weight signal related to the weight of diluent measured by the system's scale as actually charged to the tank; and (i) controlling the flow of diluent with the system controller and the diluent flow controller so that the actual weight of diluent charged does not exceed the weight required to produce the target weight of diluted chemical and the capacity of the dilution tank.

The second manner of operation is similar but is generally less preferred and involves adding a measured weight of diluent to the tank and thereafter adding a measured weight of concentrated chemical in the amount calculated by the system controller as needed to obtain the desired dilution and target volume.

In a further aspect, this invention provides a monitoring system for a liquid concentrated chemical and expressing the chemical concentration in "equivalent pounds of chlorine". This system includes a tank of known capacity. The tank is mounted upon an electronic scale which is capable of generating a series of weight signals related to the weight of the tank when empty and at various levels of filling. A plurality of level sensors are located inside the tank which are capable of generating a series of level signals related to the level of the tank at various levels of filing. The tank is in liquid communication with a source of liquid concentrated chemical having a first, but variable, concentrated chemical concentration. The system controller is capable of receiving the following pieces of data:

(a) a value related to the tank capacity;

(b) a value related to the level of the concentrated chemical in the tank;

(c) a value related to the variable, concentrated chemical concentration; and (d) a series of weight signals from the scale.

The controller calculates the weight of concentrated chemical concentration, and converts the weight of concentrated chemical concentration into an equivalent weight.

It will be understood by those skilled in the art of chemical dilution that either of these processes can be operated with the majority or all of the concentrated chemical feed or the diluent added in one unit or alternatively the materials can be added in several portions of the whole if this would facilitate mixing, or offer other advantages. In either case, the system will calculate the amounts of materials needed and provide the desired dilution and final target volume.

BRIEF DESCRIPTION OF THE DRAWINGS

This invention will be further described with reference being made to the accompanying drawings in which:

FIGS. 4(A, B and C) is a cross-section elevation view of three versions of an optional portion of the dilution system which is capable of providing values related to the concentration of the concentrated chemical feeding.

FIGS. 5A1–A4, 5B1–B4, and 5C1–C4 are three series of cross-section elevation views of a portion of dilution of FIG. 4 which depicts, in story board form, the operation of the three versions of the optional portion of the system which provides values related concentration of the concentrated chemical feeds.

DETAILED DESCRIPTION OF THE INVENTION

Figure 1:
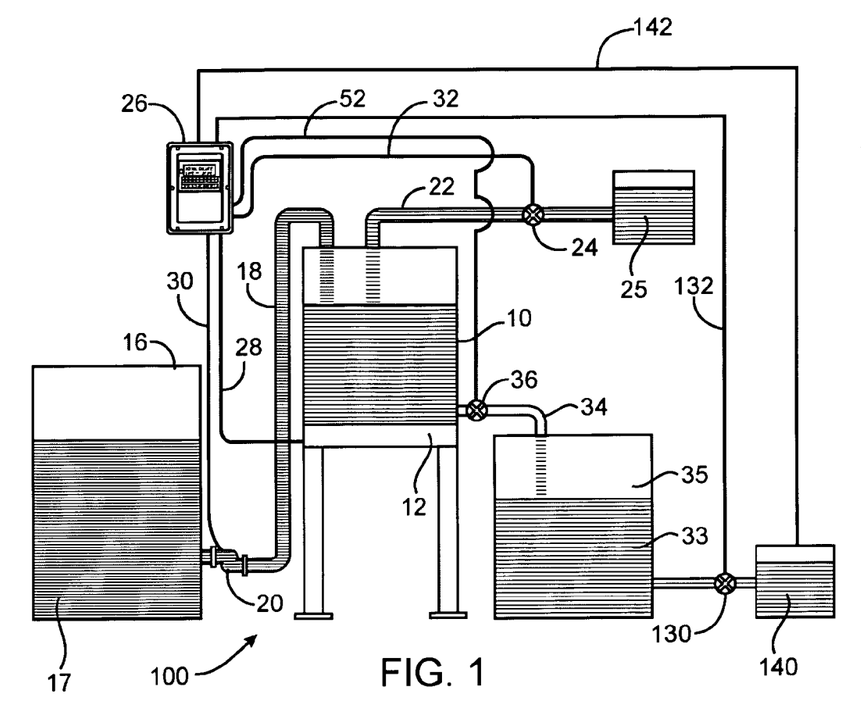
FIG. 1 is a cross-section elevation view of a dilution system of this invention.

Turning to the drawings, a system 100 for diluting chemicals in accord with this invention is shown in FIG. 1. This system and the method of its use will be described in the context of a sodium hypochlorite concentrate solution as the concentrated chemical and water as the diluent. It will be appreciated that these materials are not limiting and that this system and its use could work with a wide range of chemicals and diluents.

System 100 includes dilution tank 10. The capacity of this tank 10 is known and most commonly is smaller than might typically be selected in a manually-operated setting. This use of a smaller-than-usual dilution tank 10 is advantageous. It permits more frequent adjustments in diluted product concentration as may be needed to deal with changing needs for the diluted chemical. It also allows for a smaller capital investment. Tank 10 is positioned upon scale 12 which can generate signals related to the empty weight, full weight and partially full weight of the dilution tank. Although not critical to the invention, tank 10 and scale 12 are shown in FIG. 1 positioned on an elevated platform for gravity feed to a working tank 35. Concentrated chemical solution or suspension 17 (also known as neat chemical) is stored in chemical supply tank 16.

Concentrated chemical solution or suspension 17 can be transferred through line 18 to tank 10. Line 18 includes a flow control device, in this case embodied as controllable pump 20, which controls the flow of chemical to tank 10. As concentrated chemical solution or suspension 17 is added to the tank 10, scale 12 generates signals to indicate the exact weight of concentrated chemical solution charged to tank 10, a diluent 25 is provided to tank 10 by line 22. The flow of diluent 25 is also controlled by a flow control device, in this case solenoid valve 24. When valve 24 is opened, diluent 25 enters tank 10. Scale 12 detects and signals the weight of diluent 25 added to tank 10. The signals from scale 12 are transmitted to a system controller 26 via line 28. System controller 26 transmits control signals to pump 20 and valve 24 via lines 30 and 32 respectively. As batches of diluted chemical 33 are produced, they are taken off for use or storage in working tank 35 via line 34 and dump valve 36. Valve 36 can be a manual valve but preferably is also controlled by system controller 26 via line 52.

Figure 2:
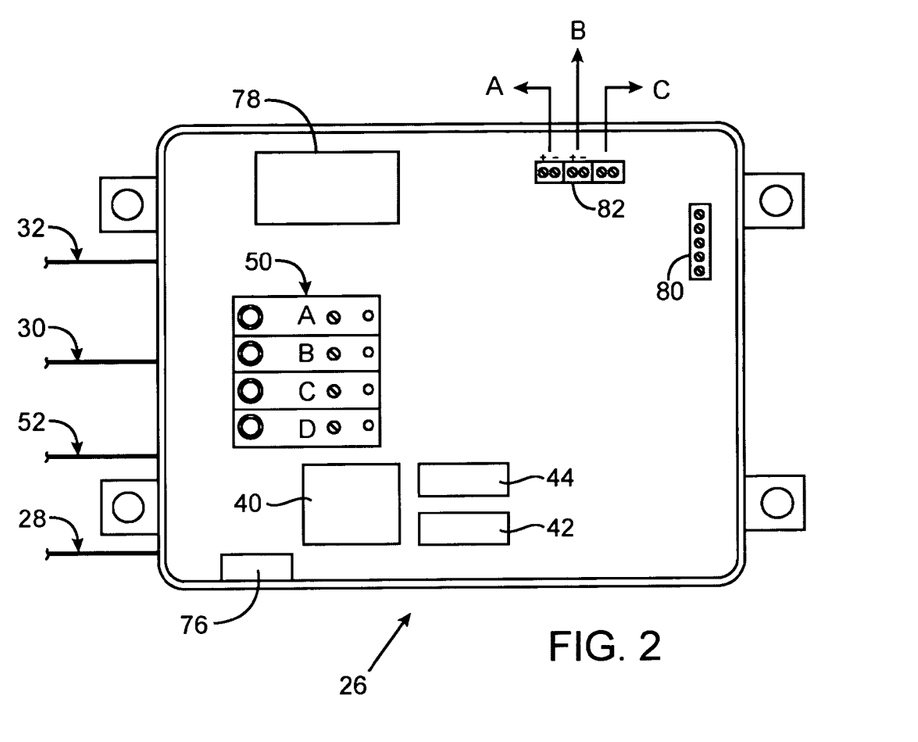
FIG. 2 is a schematic view of the component layout of the controller used in the system and method of the present invention.

Controller 26 and its several functions are described in more detail with reference to FIGS. 2 and 3. As shown there, line 28 inputs weight data from scale 12 and lines 30, 32 and 52 send control signals to pump 20, valve 24 and dump valve 36, respectively. Controller 26 includes microprocessor CPU 40, memories 42 and 44, display 46, input keyboard 48 and relays 50. These relays, A, B, C and D, can control the valves or pumps for neat chemical supply, water supply and dump valve, for example. They also can actuate alarm 76 if a warning is called for.

Controller 26 also includes a power supply 78 and scale signal input 80 which receives signals from line 28 and a series of signal outputs 82 for providing signals which can be displayed to indicate (a) that the controller is active; (b) the weight of dilute product remaining; and (c) the weight of concentrate remaining. There are representative output signals, others can be provided as determined by the user.

Figure 3:
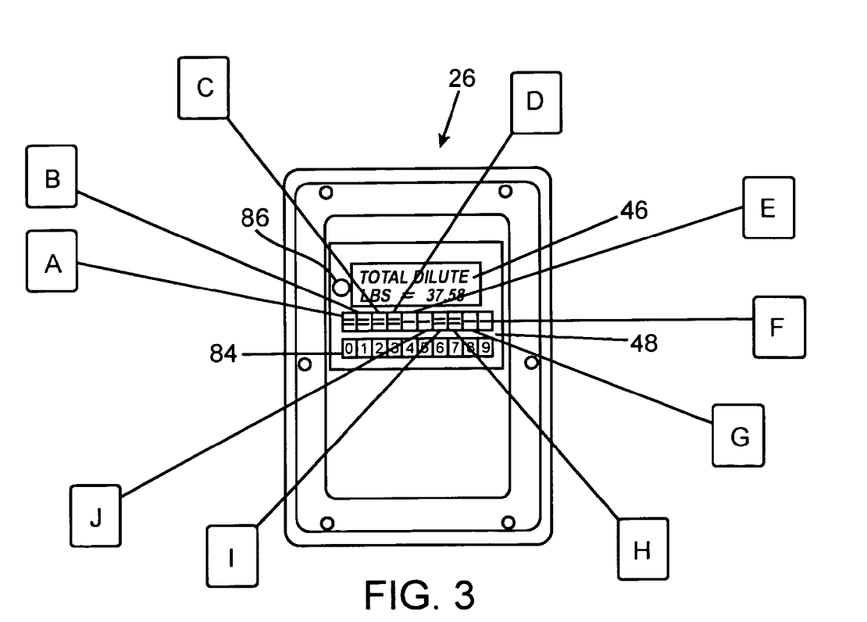
FIG. 3 is a schematic view of the controller face illustrating the keypad functions and displays of the controller used in the system and method of this invention.

As shown in FIG. 3, the controller 26 includes a display 46. The type of information displayed is commonly set by the controller or by the operator activating input keyboard 48. For example, this keyboard 48 can include a numeric keypad 84 which the operator can use to input data into the controller. Controller 26 can include reset button 86 which can be used if an error is made during data input. It can also include a series of function keys such as shown as A–J. This can cause operations to be carried out or information such as the following to be displayed:

| | | | |
|---|---|---|---|
| "A" | Feed Rate | Toggles through a multi-function display: Dilute Rate; Pure Rate |
| "B" | Daily Used | Toggles through Dilute Values: Dilute Used; Pure Used |
| "C" | Total Used | Toggles through a multi-function display: Date Last Cleared; Total Neat; Total Water; Total Dilute; Total Pure; Clear Totals |
| "D" | Batch Review | Toggles through a multi-function display: Neat Strength; Dilute Strength; Batch Size; Neat Target; Water Target |
| "E" | Start | Starts Dilution Process |
| "F" | Enter | Data Entry, Accept or Menu function access |
| "G" | Del | Backspace, Delete or Escape |
| "H" | Menu | Operations Menu | Function Description |
| | | Alarm Log | Review time and date for alarm and events |
| | | Manual Operation | Allows manual operation of neat/water/dump |
| | | Batch Setup | Input batch process parameters |
| | | Set Alarm Values | Input alarm values |
| | | Set Scale Zero | Zero the Scale |
| | | Time & Date | Current Time and Date |
| | | Clear Totals | Clear Totals/Reset Zero |
| | | Review Batch | Review batch process parameters |
| "I" | Refill Chem | (Optional) Keep track of Neat Chemical Supply: Refill/Change Out Neat; Neat Amount (lbs.); Neat Strength (%); Dilute Strength (%) |
| "J" | Stop | Stop the Dilution Process |

This information and these functions give the operator control of the dilution process and the data related to it.

Controller 26 is programmed to accept input values related to:

(a) the concentration of the concentrated chemical;

(b) the desired dilution; and (c) the batch size not to exceed the capacity of tank 10.

The system controller 26 takes that information and calculates the amounts of concentrated chemical solution or suspension 17 and diluent 25 required. The system controller 26 also controls the flow control devices to admit these amounts. Using the data supplied by the scale, it notes the actual weights of concentrate and diluent used and can make adjustments to achieve the desired dilution.

The input value relating to the concentration of the concentrated chemical can be a specific concentration value used directly by the system controller 26 in calculating the amount of concentrated chemical to be used. It can be one or more concentration-related values from which the system controller 26 can calculate the concentration of the concentrate or neat material. This latter case can be illustrated with reference to a concentrated solution of sodium hypochlorite.

As noted, this material undergoes degradation over time. In this case the values inputted could be an initial concentration value, a value related to the length of time since the initial concentration was determined and a temperature value (if temperature was a variable during the period since the initial concentration was determined). The system controller 26 can be programmed to calculate a concentrated chemical concentration based upon these values and a degradation rate constant. Similar calculation techniques can be used with other chemical concentrates.

In the case of solutions chemicals which undergo a weight change as their concentrations change, the system with its ability to quantify materials by weight can-be configured to provide a measurement value which is directly related to concentration. Three examples of this are shown in FIG. 4.

As noted above, when sodium hypochlorite degrades, it gives off chlorine, a heavy material, as a gas. The remaining partially degraded hypochlorite solution, has a lower specific gravity as a result of the loss of chlorine with the exact specific gravity being directly related to the actual concentration of sodium hypochlorite in the solution.

Since the system is already equipped with scale 12 to measure the weight of materials added to dilution tank 10, if the volume of such an addition is known, its specific gravity and hence concentration can be calculated from weight values provided by scale 12.

Figure 4A:
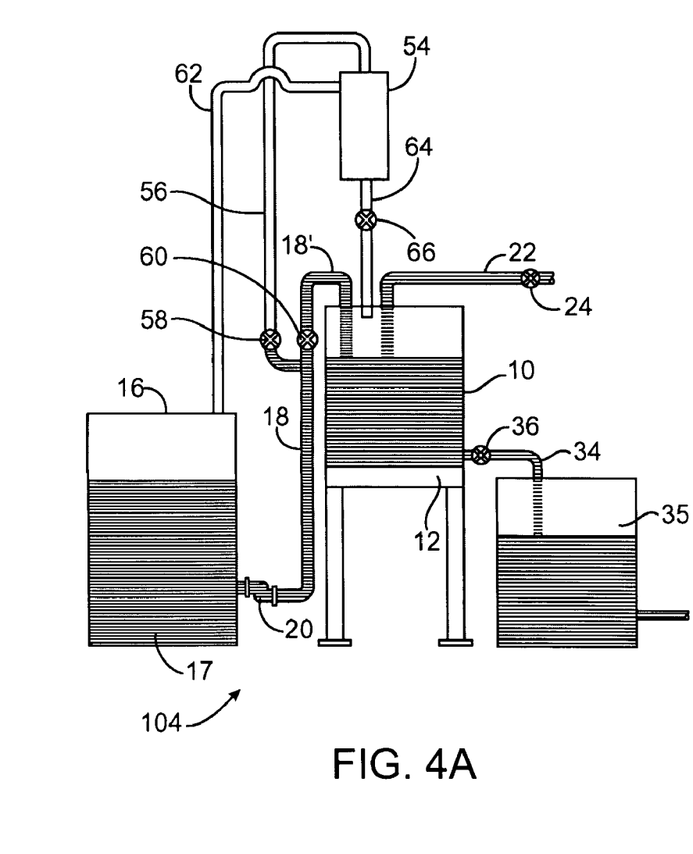

FIG. 4A shows one system 104 capable of providing the information about specific gravity. This system 104 has all the elements of system 100 of FIG. 1 and is shown in operation in the manner described with reference to FIG. 1 and system 100. System 104 includes a chamber 54 via line 56. This flow is controlled by valve 58 which is in turn controlled by controller 26 (which is not shown in this Fig.). When concentrated chemical solution or suspension 17 is being fed to chamber 54, its flow via line 18' to tank 10 can be independently controlled by valve 60. Chamber 54 is equipped with an overflow line 62 and delivery line 64. The flow of fluid out of chamber 54 via line 64 is controlled by valve 66.

Figure 4B:
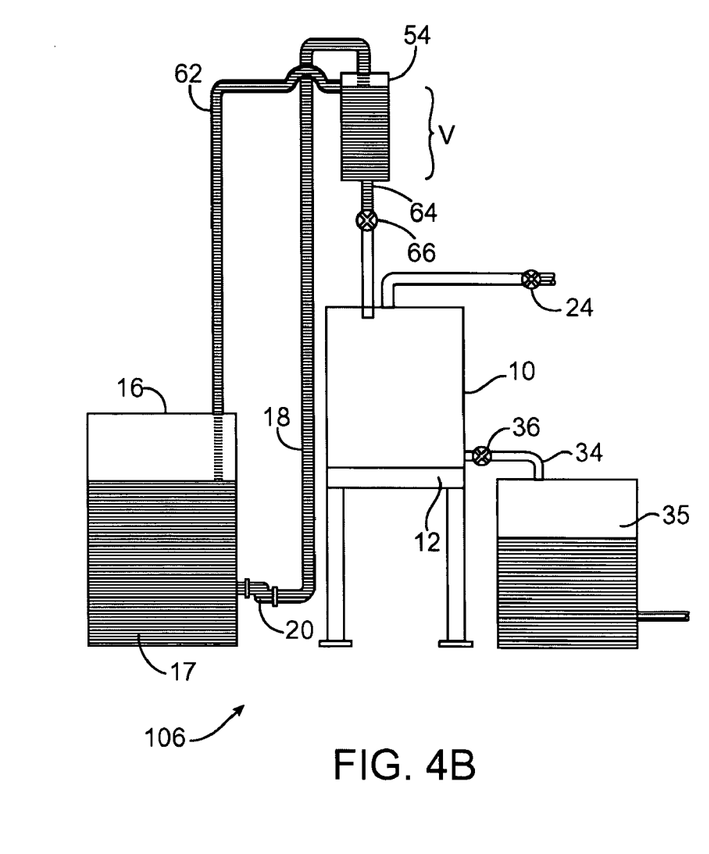

As depicted quite clearly in FIG. 4B, when feed is being fed to chamber 54, valve 66 is closed, and excess concentrate is retrieving to supply tank 16 via line 62, a volume "V" of concentrated chemical solution or suspension 17 is contained within chamber 54. V is a constant which can be measured as the system is being constructed or installed. If chamber 54 is filled as shown in FIG. 4B such that volume "V" is attained, the flow of concentrated chemical solution or suspension 17 into 54 via line 18 is halted and the volume V is then added to tank 10, there will be a weight change to tank 10 which can be accurately determined by scale 12. This weight value, combined with the volume value V can be used to determine a specific gravity for the concentrated chemical solution or suspension 17 which is directly related to the concentration of the chemical concentrate. This can be done in controller 26. Since the volume V is constant, the weight change value alone when the volume V is added can be used by controller 26 as a value related to concentration.

This same process for determining concentration can be carried out in system 106 shown in FIG. 4B. This system is simplified in that it does not have a separate line for adding additional concentrated chemical after the volume V is added but rather passes the additional volume through chamber 54 and open valve 66.

Figure 4C:
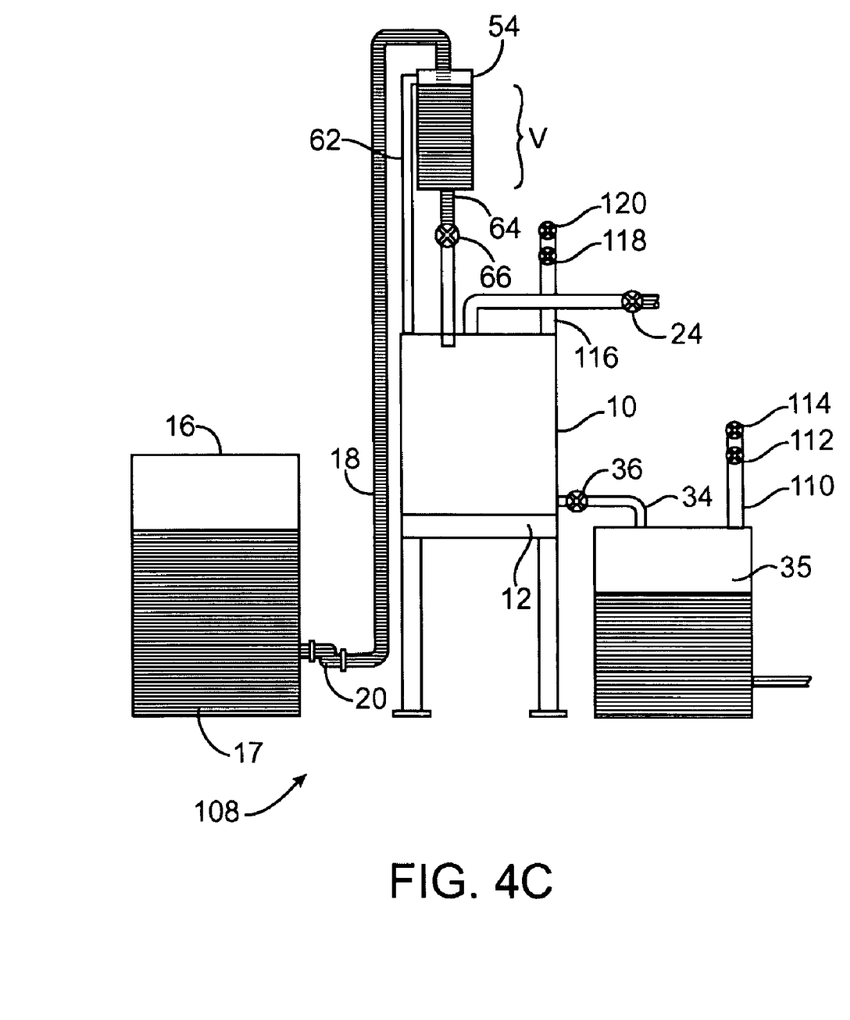

FIG. 4C shows an alternative embodiment of the systems of FIGS. 4A and 4B. The system 108 of FIG. 4C has all the elements of the systems 104, 106 of FIGS. 4A and 4B, and is shown in operation in the manner described with reference to FIG. 1 and system 100. However, in the system 108 as shown in FIG. 4C, rather than running the overflow lines 62 and delivery line 64 to the supply tank 16, the overflow line 62 and delivery line 64 runs from the chamber 54 to the dilution tank 10.

In operation, a chemical accumulator in the system controller 26 is "zeroed" so that the amount of concentrated chemical solution or suspension 17 that is added to the dilution tank 10 can be calculated. The concentrated chemical solutionl or suspension 17 is then fed to the chamber 54 via line 18. When the chamber 54 begins to overflow, the excess concentrated chemical solution or suspension 17 is fed into the dilution tank 10 via overflow line 62. As a result of the addition of chemical concentrate to the dilution tank 10, the scale 12 detects an increase in weight and sends a signal to the system controller 26 to shut off the controllable pump 20.

The chemical accumulator in the system controller 26 memorizes the weight of "overflow chemical concentrate" for later recall.

The system controller 26 starts the chemical concentration analysis process by adding volume V from the chamber 54 to the dilution tank 10 via line 64 and valve 66. Volume V is then weighed by the scale 12 to determine the strength of concentrated chemical solution or suspension 17 via specific gravity by the system controller 26. When the specific gravity of volume V is determined and a chemical concentrate target is established, the pump 20 is activated to add the concentrated chemical solutionl or suspension 17 via the line 18, the chamber 54, the line 64 and the valve 66. The weight of volume V and overflow chemical concentrate previously added to tank 10 is also applied towards chemical concentrate target value.

The use of a volume "V" as a means of determining concentration can be further exemplified by the several sequential views shown in FIG. 5. In FIG. 5 the "A" series of views is based on the system shown in FIG. 4A, the "B" series corresponds to the system in FIG. 4B and the "C" series corresponds to the system in FIG. 4C.

In FIGS. $5A^1$, $5B^1$ and $5C^1$ the system is shown with tank 10 empty, although in actual practice it can contain diluted chemical as long as its weight is known prior to the time the volume V of concentrate is added to it. As shown in FIGS. $5A^2$, $5B^2$ and $5C^2$ in the second stage concentrated chemical solution is pumped to chamber 54 via line 18. Valve 66 is closed and concentrate is fed until it flows out of vessel 54 and is returned to tank 16 via line 62 in FIGS. $5A^2$ and $5B^2$. In FIG. $5C^2$, the concentrate is fed until it flows out of vessel 54 and into tank 10 via line 62. The volume between valve 66 and the overflow port leading to line 62 has previously been measured as volume V.

Figure 5A:
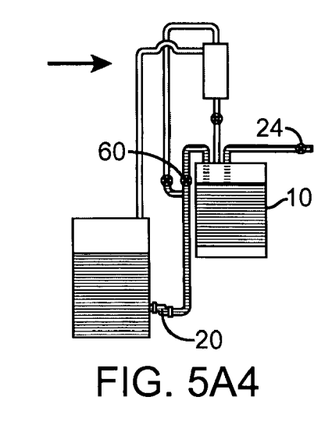
Figure 5A:
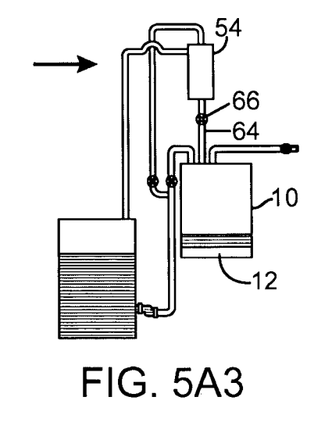
Figure 5A:
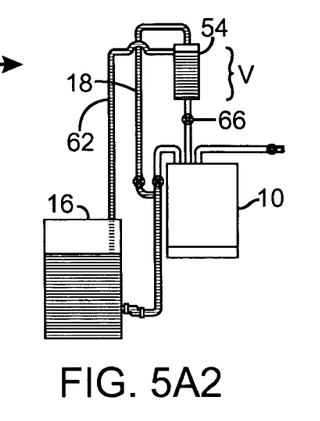
Figure 5A:
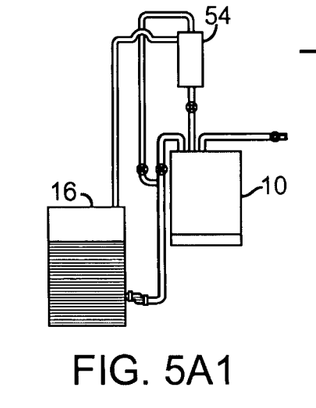
Figure 5B:
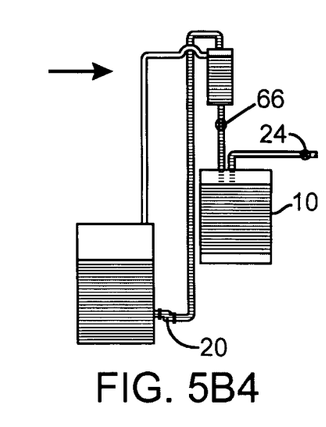
Figure 5B:
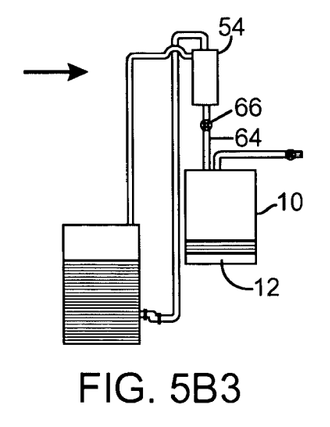
Figure 5B:
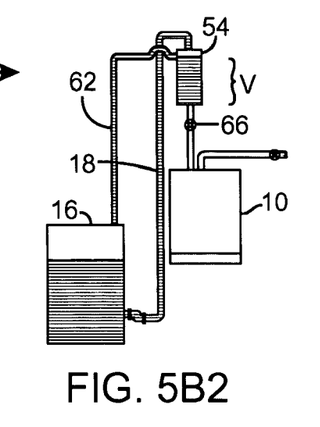
Figure 5B:
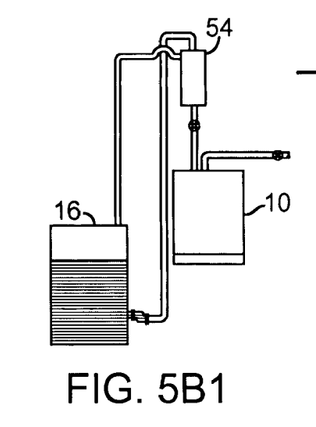
Figure 5C:
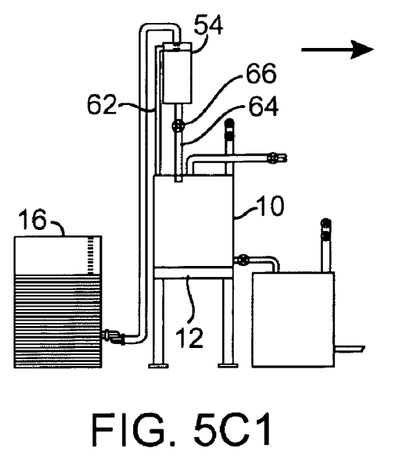
Figure 5C:
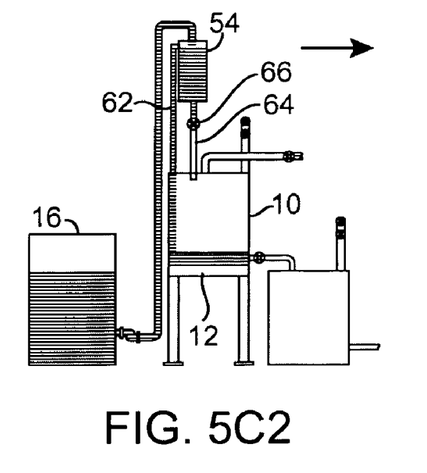
Figure 5C:
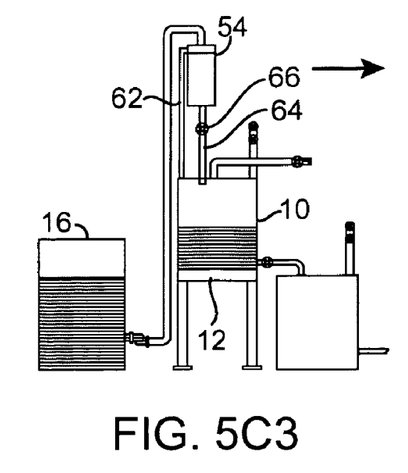

FIGS. $5A^3$, $5B^3$ and $5C^3$ show this amount of concentrate is added to tank 10 via line 64. Scale 12 determines the weight change of tank 10 when volume V of concentrate is added to it.

Figure 5C:
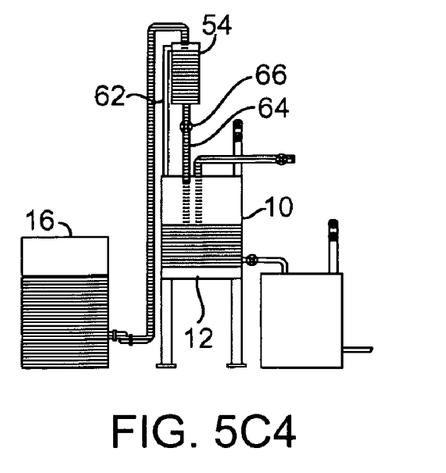

This value is used by controller 26 to calculate the amount of concentrate needed to complete a batch of diluted chemical and this amount is then added as shown in FIGS. $5A^4$, $5B^4$ and $5C^4$ by controlling pump 20 and valves 60 or 66 for concentrate. An amount of diluent 25 is calculated and added via line 22 and valve 24. As always, the weights of materials actually added are measured by scale 12 and this information is used by controller 26 in controlling the operation of pump 20 and valve 24.

One can also determine the weight of a known volume of concentrate using a known portion of the volume of tank 10 as the measured volume, so long as tank 10 is consistently emptied before the concentrate is added.

Figure 6:
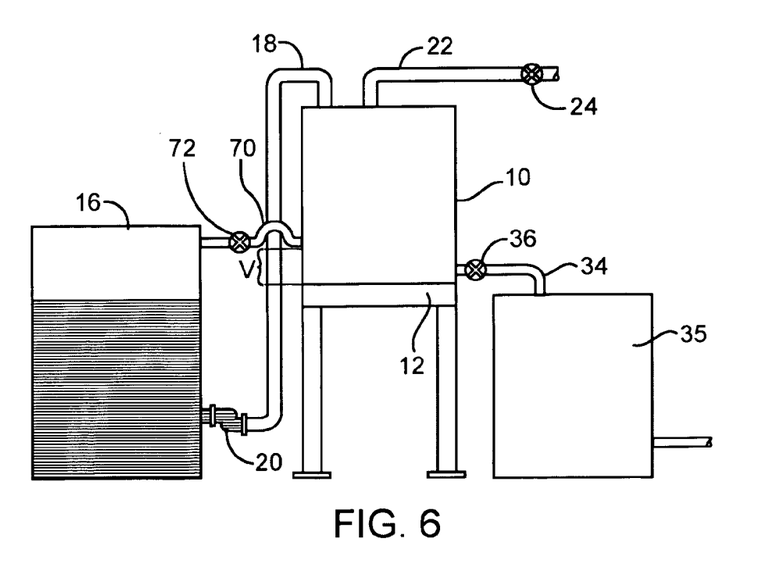
FIG. 6 corresponds to FIG. 4 and shows a third embodiment of the optional portion of the system for determining a value related to the concentrated feed concentration.

FIG. 6 shows one configuration for doing this. A return line 70 with valve 72 is placed between dilution tank 10 and supply tank 16. This line is positioned in tank 10 so that it defines a known volume V of concentrate in the tank 10 when the tank if filled to its level.

Figure 7A:
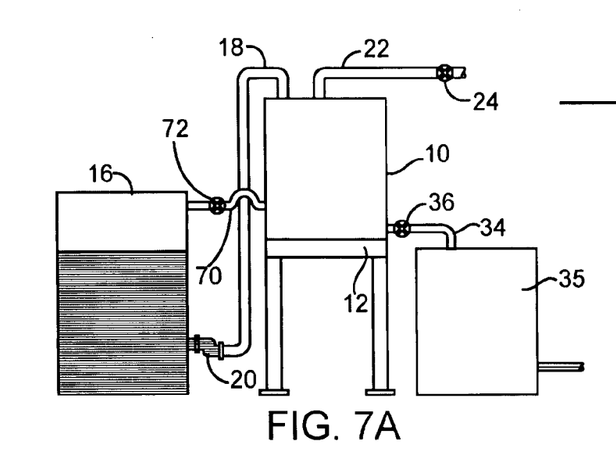
FIGS. 7A–7D corresponds to FIG. 5 showing the operation of this third embodiment.
Figure 7B:
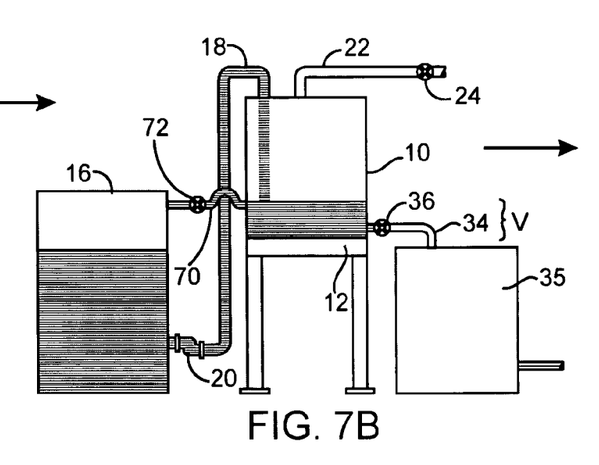

As shown in FIG. 7A, initially tank 10 is empty. In FIG. 7B controlling pump 20 is feeding concentrate through line 18 to tank 10. Valve 36 is closed and tank 10 is filled to a known volume V defined by line 70 and valve 72. As shown in FIG. 7B, excess concentrate is passed through line 70 back to tank 16.

Figure 7C:
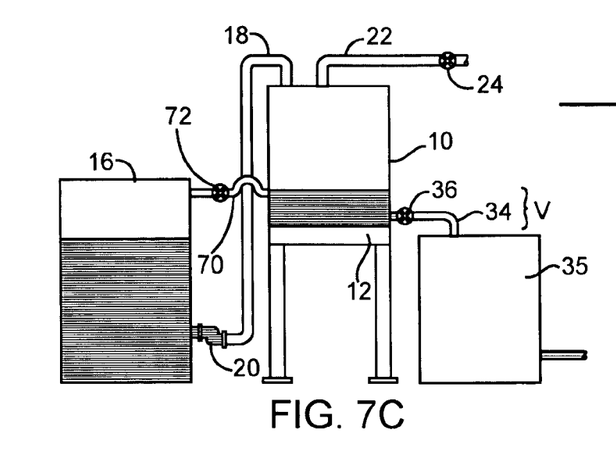
Figure 7D:
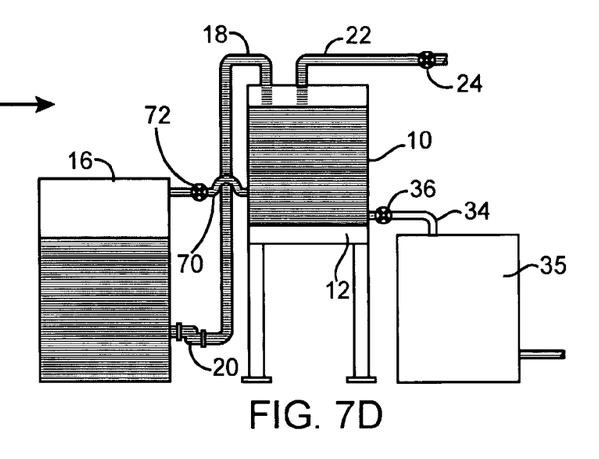

As shown in FIG. 7C controlling pump 20 is then shut off and the flow of excess concentrate through line 70 is completed. Now the volume of concentrate in tank 10 is exactly the volume "V" defined by the location of line 70 leaving tank 10. The weight of this volume V is determined by scale 12 and this value is used by controller 26 to define the concentration of the concentrate. The controller then calculates the amount of concentrate and the amount of diluent required closes valve 72 and meters these amounts of concentrate and diluent into tank 10 as shown in FIG. 7D to complete the batch of diluted chemical.

As noted in FIG. 3, the controller can be programmed to perform a wide range of additional functions and achieve a wide range of additional advantages.

The dilution system of this invention provide many advantages over the dilution systems and methods of the past. For one, it permits the operator to directly "dial a solution strength" into the controller through keyboard 48 and achieve this desired dilution with little or no manual intervention.

In addition, and importantly, the automation and weight-based accuracy provided by the present system allows batches to be made more frequently, (and thus to be smaller.) With this "MB squared" (Mass Based+Micro Batch) technology, the user can instantly adjust to different beginning and ending solution strengths in order to maximize dosing accuracy and consistency. This system and method for continuously and automatically creating small weight-based batches can achieve accuracies of 1 part in 1000 of desired solution strength.

Following is a further summary of the main features and benefits that this dilution control system can provide:

Flexibility

Dial-A-Solution Strength: The dilution controller allows the user to easily enter or change a beginning (neat) solution strength, and then easily enter or change the desired ending solution strength (dilute) based on the needs of the application. The controller then automatically calculates the necessary amounts of water and the chemical needed to make a predetermined batch size and batch strength. For chemicals like sodium hypochlorite, this flexibility is extremely important because the beginning (neat) strength is continually decreasing and the ending solution strength needed will change as water demand changes. This flexibility offers the following benefits:

(a) it allows metering pumps which feed hypochlorite to water systems to run at optimum efficiency by allowing the changing of the end solution strength based on the water demand;

(b) this gives greater range to the low end of such metering pump, delivers a more repeatable and accurate chemical dose, optimizes compound loop controls because of a more consistent/accurate chemical dose, makes it easy to adjust to changing or different neat chemical strengths and makes it easy to adjust to changing water capacities or water demands; and (c) the accuracy and repeatability achieved using this system is outstanding. By using mass based batching combined with making multiple "micro batches", the controller can achieve the most accurate form of dilution control available. This process can be continuous and automatic when in the "System Activated" mode. This eliminates under and over dosing and achieves desired solution strengths as accurate as 1 part in 1000.

Chemical Accountancy:

The controller can also provide chemical accountancy functions. The dilution controller has a number of features that allow the user to track: Remaining Chemical Quantity, Chemical Feed Rates and Chemical Usages. By tracking these various figures, the user can gain superior control of their chemical dosing system in order to save money on chemicals, satisfy government reporting requirements and keep their water and treatment plant safe. Features include displays of Usage Totalizer for Neat chemical, Dilute Chemical, Pure Chemical and Water. While measured in weight, these values can be expressed in weight or volume units as desired. The controller also has a Daily Usage Datalogger which stores each of the previous ten days usage of dilute chemical. The Datalogger can also convert daily dilute chemical usage to "pure" chemical usage, if desired. "Pure" is defined as 100% concentration of reactant.

The controller can also provide additional reports such as Net Remaining Dilute chemical present in the dilution tank and Feed Rate for Dilute chemical (also converts to current "pure" chemical feed rate).

Alarms:

The controller can also be set to activate process alarms. By monitoring the weight of the dilution tank in real time either continuously or at predetermined time intervals, and comparing the weights measured with inputted or calculated desired values, the controller can pick up potential problems with the chemical dosing system that would otherwise go undetected. This prevents the possibility of over- or under-dosing the water supply. Alarms can pause the dilution process and give a 0.5 amp dry relay contact which can be used to trigger a variety of alarms.

These alarm functions can include:

1. Slow neat chemical transfer alarm: This alarm would be triggered if the system controller noted that the weight of neat chemical charged to the dilution tank, as measured by the scale, was less than expected. This prevents underdosing by indicating that the neat chemical feed vessel chemical is empty, a transfer pump failure or blockage in the neat transfer lines.

2. Slow diluent transfer alarm: This alarm would be triggered if the system controller noted that the weight of diluent charged to the dilution tank, as measured by the scale, was less than expected. This prevents overdosing by indicating a problem with the diluent supply pressure or a solenoid valve failure.

3. Slow dilute chemical feed alarm: This alarm would be triggered if the system controller noted that the weight of diluted chemical in the dilution tank, as measured by the scale, was greater than expected. This prevents underdosing by indicating a metering pump failure and/or a blockage in the out feed lines.

4. Maximum chemical usage alarm: This alarm would be triggered if the system controller noted that the weight of diluted chemical in the dilution tank, as measured by the scale, was less than expected. This prevents prolonged overdosing by giving an alarm that the desired maximum usage rate of chemical has been or is being exceeded.

5. Dilution tank high level alarm: This alarm would be triggered if the system controller noted that the weight of material in the dilution tank, as measured by the scale, was equal to or exceeded the capacity of the dilution tank and the desired degree of dilution had not been achieved. This could occur if there had been an incomplete transfer of the preceding batch. This alarm prevents overfilling of the dilution tank.

6. Batch strength not available alarm: This alarm is triggered when the controller notes a weight of chemical or diluent and a target dilution value which would lead to overfilling the dilution tank. This alarm prevents overfilling of the dilution tank.

Vent Lines, Check Valves and Flow Switches

The dilution systems can also be designed with additional safety features to prevent potential chemical spills. Chemical spills can be avoided by adding vent lines, check valves and flow switches to any of the tanks so that the chemical concentrate is contained within the tanks. These safety features function as follows:

Shown in FIG. 4C is the integration of vent lines 110, 116 from both the dilution tank 10 and the working tank 35 to prevent the tanks from vacuum locking as a result of a decrease in the tank levels of the diluted chemical or end solution 33. The vent lines 110, 116 will preferably vent to the atmosphere, however, it can be appreciated that the vent lines 110, 116 can vent to a waste tank or other disposal system. Furthermore, as a safety precaution, a check valve 114, 120 can be added at the top of the vent lines 110, 116 which will prevent any inadvertent overfilling of either the dilution tank 10 or working tank 35. A flow switch 112, 118 located in the vent line 110, 116 for detecting flow in the vent lines 110, 116 can also be provided to shut down the entire dilution process via a main relay breaker if either the dilution tank 10 or working tank 35 is overfilled.

Other features and benefits include a straightforward proof of accuracy by simply placing a known weight on the weighing platform. There is also easy checking of batch parameters: the controller can provide a review function to review dilution batch parameters. It can also allow the operator to "abort" or "continue" a batch if it is terminated in the middle of a "Fill" It can also allow the operator to either "manually" finish a batch or "dump" it to the feed tank if a partial batch exists in the dilution tank. The controller can also be set up to provide an "auto compensation" function that automatically recalculates diluent target when the calculated requirements of concentrated chemical is exceeded.

In addition to the benefits that the dilution control system can provide as set forth above, the system controller 26 can provide many additional automation and weight-based features for improved accuracy of chemical concentrate and end solution delivery to a water system. The system controller 26 can provide automatic adjusting of end solution strength based on water demand, equivalent pounds of chlorine gas readings for easier reading of available chemical concentrate, and automatic refilling of the working tank based on water demand.

Automatic Adjusting of the End Solution Strength

The system controller 26 includes the ability to automatically adjust the diluted chemical strength or end solution strength based on water demand. The ability to automatically adjust the diluted chemical strength or end solution provides the user with the ability optimize pump speeds and residual loop controls. In addition, by automating strength of the end solution based on water demand, the system allows batches to be made more frequently, and thus smaller without affecting the accuracy and consistency of the end solution.

In one embodiment, as shown in FIG. 1, a metering pump 130 feeds diluted chemical or end solution 33 to a water system 140. As with any mechanical pump, the metering pump 130 has an optimum efficiency range wherein the pump operates while pumping end solution 33 to the water system. Thus, if the amount of end solution 33 needed in the water system 140 is reduced, the amount of end solution 33 delivered via the metering pump 130 will be adjusted by reducing the speed of the metering pump 130. Alternatively, if the water demand increases, the speed of the pump will be increased to deliver more end solution 33 to the water system 140. However, if the pump speed decreases or increases outside of its optimum efficiency range, the accuracy or delivery of a repeatable and accurate chemical dose by the metering pump 130 is compromised. Accordingly, it would be desirable that the metering pump 130 operate at all times in its optimum efficiency range.

In order to overcome these problems, the system controller 26 has the capability of automatically adjusting the volume and strength of the end solution 33. In operation, the system controller 26 receives input signals 132, 142 from the metering pump 130 and water system 140, respectively, as to the pump speed and the amount of water in the water system. If the pump speed is within the optimum efficiency range, the system controller 26 will not adjust the end solution 33 strength. However, if the amount of water in the water system 140 has decreased, which results in the pump speed also decreasing beyond a desired pump speed, the system controller 26 automatically adjusts the strength of the end solution 33.

Generally, a metering pump's 130 optimum efficiency is approximately 50 to 70 percent of its maximum speed. For example, at its optimum efficiency, a metering pump 130 will pump a volume of 100 gallons per minute of 6 percent chlorine end solution which is capable of treating 500 gallons per minute of water in a water system 140. However, if the volume of the water in the system decreases to 250 gallons per minute, the amount of end solution 33 required to treat the water will be approximately one-half of the original amount or approximately 50 gallons per minute of 6 percent chlorine solution. Alternatively, the amount of end solution could be adjusted to 100 gallons per minute of 3 percent chlorine solution which would provide the same effective treatment to the water system 140. Thus, by adjusting the end solution strength, the metering pump 130 will continue to operate at its optimum efficiency of 50–70 percent of its capacity by pumping 100 gallons per minute.

In order to accomplish an automated adjustment of the end solution, strength, a plurality of signals 132, 142 are sent from the metering pump 130 to the system controller 26. The system controller 26 will receive the signals 132, 142, indicating the metering pump 130 speed in strokes per minute, which in turn can be used to calculate the efficiency rate of the pump, and the amount of water in the water system 140, respectively. If the signals 132,142 indicate that the flow of water in the water system 140 has decreased or is decreasing, which in turn would result in a decrease in the pump speed outside of the metering pump's 130 optimum efficiency range, the system controller 26 calculates a reduced end solution strength by decreasing the amount of diluent 25 being added to the concentrated chemical solution or suspension 17. Once the end solution strength is decreased, it will be delivered to the working tank 35 and pumped through the metering pump 130 into the water system 140.

The system controller 26 is also able to increase the end solution 33 strength in the event that the amount of water in the water system 140 increases. Specifically, if the signal 142 from the water system 140 indicates an increase in the amount of water in the water system 140, which results in the metering pump 130 having to operate at a higher efficiency than desired, the amount of diluent 25 can be decreased in the volume of diluted chemical or end solution 33 delivered to the water system 140. Thus, by increasing the end solution strength, the metering pump 130 will not be required to pump as much end solution, such that the metering pump 130 speed remains within its optimum efficiency range. It can be also appreciated that the system controller 26 can be programmed to automatically change the end solution strength based solely on water demand in the water system or any other variable within the system wherein a change in the end solution strength is desired.

Equivalent Pounds of Chlorine GapMonitor:

Generally, concentrated chemicals, such as sodium hypochlorite, vary in strength and are measured or given in a "volume and sample strength" which is described as 100 gallons of 12 percent sodium hypochlorite. However, it would be desirable to provide the amount of remaining chemical concentrate or sodium hypochlorite in a given system in "equivalent pounds of pure chlorine gas".

Figure 8:
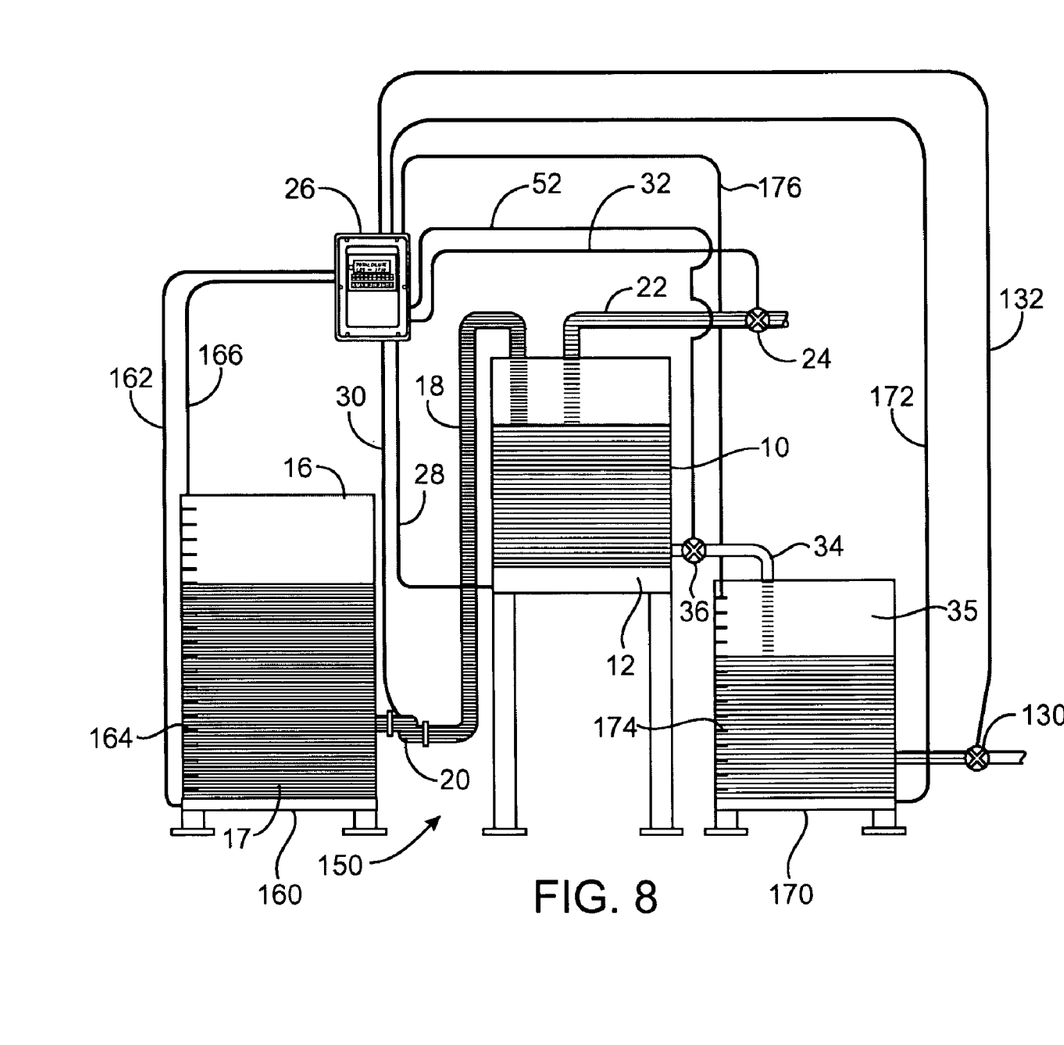
FIG. 8 is a cross-section elevation view of an alternative embodiment of a dilution system of this invention.

FIG. 8 shows a system 150 capable of providing "equivalent pounds of chlorine pure gas". This system 150 includes a system controller 26 which provides continuous monitoring of the volume and weight of sodium hypochlorite in a given tank. For purposes of an example, the system 150 will be described in relationship to the feed tank 16; however, the same system would also work in a working tank 35 or any other type of tank combining a source of liquid concentrated chemical having a first, but variable, concentrated chemical concentration. The feed tank 16 is positioned upon a scale 160 (170), similar to scale 12, which can generate signals 162 (172) related to the empty weight, full weight and partially full weight of the feed tank 16. Typically, the feed tank 16 will store or hold a concentrate chemical solution or suspension 17, such as sodium hypochlorite. In addition, the feed tank 16 will have a plurality of level sensors 164 (174) for measuring and generating a signal 166 (176) as to the volume of the chemical solution 17 within the feed tank 16.

In one embodiment, the weight and volume of the chemical solution 17 are continuously monitored and sent via a plurality of signals 162, 166 to the system controller 26. The system controller 26 calculates the specific gravity and thus the strength of the chemical in the feed tank 16 based on the weight and volume of the chemical concentrate. The quantity of the chemical concentrate will be measured in equivalent pounds of pure chemical concentrate by multiplying the strength of the chemical concentrate times the weight of chemical concentrate to produce a reading in equivalent pounds of pure chemical. The monitoring process is continuous such that an end-user can determine the amount of available chemical concentrate in equivalent pounds rather than a sample strength. The available chemical concentrate in equivalent weight is shown on the display 46 of the system controller 26, so that an operator can visually view the equivalent weight at any moment in time. It can be appreciated that the equivalent weight can be in pounds, tons, grams, kilograms or any other unit of weight.

While this invention has been described with reference to the preferred embodiment described above, it will be appreciated that the configuration of this invention can be varied and that the scope of this invention is defined by the following claims.

What is claimed is:

1. A system for diluting a chemical for water treatment comprising:
    a dilution control system comprising:
        a dilution tank of known capacity for preparing the chemical in a desired diluted concentration, the tank mounted upon an electronic scale, the scale being capable of generating a series of weight signals related to the weight of the tank when empty and at various levels of filling;
        a source of liquid concentrated chemical feed having a first, but variable, concentrated chemical concentration;
        a chemical feed flow controller for controlling the flow of concentrated chemical feed to the dilution tank;
        a source of liquid diluent;
        a diluent flow controller for controlling the flow of diluent to the dilution tank;
        a system controller:
            for receiving:
                (a) a value related to the dilution tank capacity;
                (b) a value related to the variable, concentrated chemical concentration;
                (c) a value related to the desired diluted concentration; and
                (d) a series of weight signals from the scale;
            for calculating the amounts of concentrated chemical and diluent required to provide a target amount of diluted chemical of desired diluted concentration which does not exceed the known capacity of the dilution tank; and
            for controlling the chemical feed flow controller and the diluent flow controller based upon the series of weight signals to produce a produced quantity of diluted chemical, the produced quantity related to the target amount of diluted chemical and not exceeding the capacity of the dilution tank; and
        a source of water, wherein the dilution control system continuously creates small weight-based batches of the diluted chemical of desired diluted concentration based on changing water demands from the source of water.

2. The system of claim 1, additionally comprising providing a value related to the level of the tank at various levels of filing to the system controller.

3. The system of claim 1, additionally comprising a working tank in liquid communication with the dilution tank and into which the diluted chemical can be passed.

4. The system of claim 3, additionally comprising at least one vent line in outlet liquid communication with the working tank.

5. The system of claim 4, additionally comprising a check valve and a flow switch wherein the flow switch is able to shut down the system if flow is detected in the vent lines.

6. The system of claim 1, wherein the value related to the variable, concentrated chemical concentration is a concentrated chemical concentration.

7. The system of claim 1, additionally comprising at least one vent line in outlet liquid communication with the dilution tank.

8. The system of claim 1, additionally comprising a pump for feeding diluted chemical to the source of water wherein the system controller receives a value related to a speed of the pump and calculates the amounts of concentrated chemical and diluent required to provide the target amount of diluted chemical of desired diluted concentration for operating the pump at an optimum efficiency.

9. A dilution system for a chemical comprising:
    a dilution tank of known capacity for preparing the chemical in a desired diluted concentration, the tank mounted upon an electronic scale, the scale being capable of generating a series of weight signals related to the weight of the tank when empty and at various levels of filling;
    a source of liquid concentrated chemical feed having a first, but variable, concentrated chemical concentration;

a chemical feed flow controller for controlling the flow of concentrated chemical feed to the dilution tank;
a source of liquid diluent;
a diluent flow controller for controlling the flow of diluent to the dilution tank;
a source of water;
a system controller:
for receiving:
 (a) a value related to the dilution tank capacity;
 (b) a value related to the variable, concentrated chemical concentration;
 (c) a value related to the desired diluted concentration;
 (d) a series of weight signals from the scale; and
 (e) a value related to a source of water;
for calculating the amounts of concentrated chemical and diluent required to provide a target amount of diluted chemical of desired diluted concentration which does not exceed the known capacity of the dilution tank;
for controlling the chemical feed flow controller and the diluent flow controller based upon the series of weight signals to produce a produced quantity of diluted chemical, the produced quantity related to the target amount of diluted chemical and not exceeding the capacity of the dilution tank; and
wherein the system controller continuously creates small weight-based batches of the diluted chemical of desired diluted concentration based on changing water demands from the source of water.

10. The dilution system of claim 9, additionally comprising a working tank in liquid communication with the dilution tank and into which the diluted chemical can be passed.

11. The dilution system of claim 10 additionally comprising at least one vent line in outlet liquid communication with the working tank.

12. The dilution system of claim 11, additionally comprising a check valve and a flow switch wherein the flow switch is able to shut down the system if flow is detected in at least one the vent line.

13. The dilution system of claim 12, additionally comprising a check valve and a flow switch wherein the flow switch is able to shut down the system if flow is detected in the at least one vent line.

14. The dilution system of claim 9, additionally comprising a readable memory into which weight signals are stored the weight signals being from the series of weight signals related to at least one of:
the target amount of diluted chemical produced by the dilution system;
weight of chemical present in the target amount of diluted chemical produced by the dilution system; and
the weight of diluent present in the target amount of diluted chemical produced by the dilution system.

15. The dilution system of claim 9, additionally comprising at least one vent line in outlet liquid communication with the dilution tank.

16. The dilution system of claim 9, additionally comprising a pump for feeding diluted chemical to a source of water wherein the system controller receives a value related to a speed of the pump and calculates the amounts of concentrated chemical and diluent required to provide the target amount of diluted chemical of desired diluted concentration for operating the pump at an optimum efficiency.

17. The dilution system of claim 9, additionally comprising:
a chemical supply tank of known capacity having the source of liquid concentrated chemical feed, the chemical supply tank mounted upon a scale, the scale being capable of generating a series of weight signals related to the weight of the tank when empty and at various levels of filing;
a plurality of level sensors located inside the chemical supply tank, the level sensors being capable of generating a series of level signals related to the level of the tank at various levels of filing; and
wherein the system controller calculates and displays an amount of concentrated chemical feed in a weight equivalent.

18. A dilution system for a chemical comprising:
a dilution tank of known capacity for preparing the chemical in a desired diluted concentration, the tank mounted upon an electronic scale, the scale being capable of generating a series of weight signals related to the weight of the tank when empty and at various levels of filling:
a source of liquid concentrated chemical feed having a first, but variable, concentrated chemical concentration:
a chemical feed flow controller for controlling the flow of concentrated chemical feed to the dilution tank;
a source of liquid diluent;
a diluent flow controller for controlling the flow of diluent to the dilution tank;
a source of water;
a chamber of known volume in inlet liquid communication with the source of concentrated chemical feed and in outlet liquid communication with the dilution tank for adding a known volume of concentrated chemical feed to the dilution tank;
a system controller;
for receiving:
 (a) a value related to the dilution tank capacity;
 (b) a value related to the variable, concentrated chemical concentration;
 (c) a value related to the desired diluted concentration;
 (d) a series of weight signals from the scale; and
 (e) a value related to a source of water;
for calculating the amounts of concentrated chemical and diluent required to provide a target amount of diluted chemical of desired diluted concentration which does not exceed the known capacity of the dilution tank;
for controlling the chemical feed flow controller and the diluent flow controller based upon the series of weight signals to produce a produced quantity of diluted chemical, the produced quantity related to the target amount of diluted chemical and not exceeding the capacity of the dilution tank; and
wherein the system controller continuously creates small weight-based batches of the diluted chemical of desired diluted concentration based on changing water demands from the source of water.

19. The dilution system of claim 18, additionally comprising an overflow line, the overflow line in outlet liquid communication with the chamber and inlet liquid communication with the source of concentrated chemical feed.

20. The dilution system of claim 19, additionally comprising an overflow line, the overflow line in outlet liquid communication with the chamber and inlet liquid communication with the source of chemical in a desired dilution concentration within the dilution tank.

21. A system for diluting a chemical for water treatment comprising:
a dilution tank of known capacity for preparing the chemical in a desired diluted concentration, the tank mounted upon an electronic scale, the scale being capable of generating a series of weight signals related to the weight of the tank when empty and at various levels of filling;

a source of liquid concentrated chemical feed having a first, but variable, concentrated chemical concentration;

a chemical feed flow controller for controlling the flow of concentrated chemical feed to the dilution tank;

a source of liquid diluent;

a diluent flow controller for controlling the flow of diluent to the dilution tank;

a system controller:
  for receiving:
    (a) a value related to the dilution tank capacity;
    (b) a value related to the variable, concentrated chemical concentration;
    (c) a value related to the desired diluted concentration; and
    (d) a series of weight signals from the scale, wherein the series of weights signals are actual weights of concentrated chemical concentration and diluent;
  for calculating the amounts of concentrated chemical and diluent required to provide a target amount of diluted chemical of desired diluted concentration which does not exceed the known capacity of the dilution tank;
  for adjusting the amount of concentrated chemical or diluent required to provide the target amount of diluted chemical of desired concentration based on the actual weights of concentrated chemical concentration and diluent within the dilution tank;
  for controlling the chemical feed flow controller and the diluent flow controller based upon the series of weight signals to produce a produced quantity of diluted chemical, the produced quantity related to the target amount of diluted chemical and not exceeding the capacity of the dilution tank; and a pump for feeding diluted chemical to a source of water wherein the system controller receives a value related to a speed of the pump and calculates the amounts of concentrated chemical and diluent required to provide a target amount of diluted chemical of desired diluted concentration for operating the pump at an optimum efficiency.

* * * * *